United States Patent [19]

Ochi et al.

[11] Patent Number: 4,580,160

[45] Date of Patent: Apr. 1, 1986

[54] COLOR IMAGE SENSOR WITH IMPROVED RESOLUTION HAVING TIME DELAYS IN A PLURALITY OF OUTPUT LINES

[75] Inventors: Shigeharu Ochi; Jun Inada, both of Santa Clara, Calif.

[73] Assignee: Fuji Photo Film Co., Ltd., Kanagawa, Japan

[21] Appl. No.: 592,204

[22] Filed: Mar. 22, 1984

[51] Int. Cl.[4] .......................................... H04N 9/077
[52] U.S. Cl. ........................................ 358/48; 358/44
[58] Field of Search ....................... 358/41, 43, 44, 48

[56] References Cited

U.S. PATENT DOCUMENTS

| 4,441,123 | 4/1984 | Ochi | 358/44 |
| 4,516,154 | 5/1985 | Nishizawa et al. | 358/44 |
| 4,542,409 | 9/1985 | Ochi | 358/212 |

Primary Examiner—Michael A. Masinick
Assistant Examiner—Randall S. Svihla
Attorney, Agent, or Firm—Sughrue, Mion, Zinn, Macpeak, and Seas

[57] ABSTRACT

A solid-state color image sensor and a method for operating such an image sensor in which high resolution is provided by delaying outputs from the various pixels in the sensor array by delay times determined in accordance with the actual positions of the pixels in the row direction of the array. Pixels are read out simultaneously in groups of three, one for each of white, cyan and yellow. The delays are imposed upon two of these. The delayed and undelayed outputs are combined with sum/difference circuits to produce chrominance and luminance signals. Preferably, the pixels have hexagonally shaped light sensitive areas to maximize the light sensitivity of each pixel and hence the resolution of the device.

10 Claims, 26 Drawing Figures

FIG. 1

PRIOR ART

FIG 5A
HORIZONTAL SHIFT REGISTER PERIODS (37- )

FIG. 5B
Ye (35-1)

FIG. 5C
Cy DELAYED (36-2)

FIG. 5D
W DELAYED (36-3)

FIG. 5H
Y FILTERED (57-1)

FIG. 5I
R FILTERED (57-2)

FIG. 5J
B FILTERED (57-3)

FIG. 6

FIG. 7A
HORIZONTAL
SHIFT REGISTER
PERIOD (37-)

FIG. 7H
Y FILTERED (57-1)

FIG. 7I
R FILTERED (57-2)

FIG. 7J
B FILTERED (57-3)

COLOR IMAGE SENSOR WITH IMPROVED RESOLUTION HAVING TIME DELAYS IN A PLURALITY OF OUTPUT LINES

BACKGROUND OF THE INVENTION

The invention pertains to a solid-state color image sensor device which provides improved resolution for both color and luminance information contained in an image being sensed.

Figure 1:
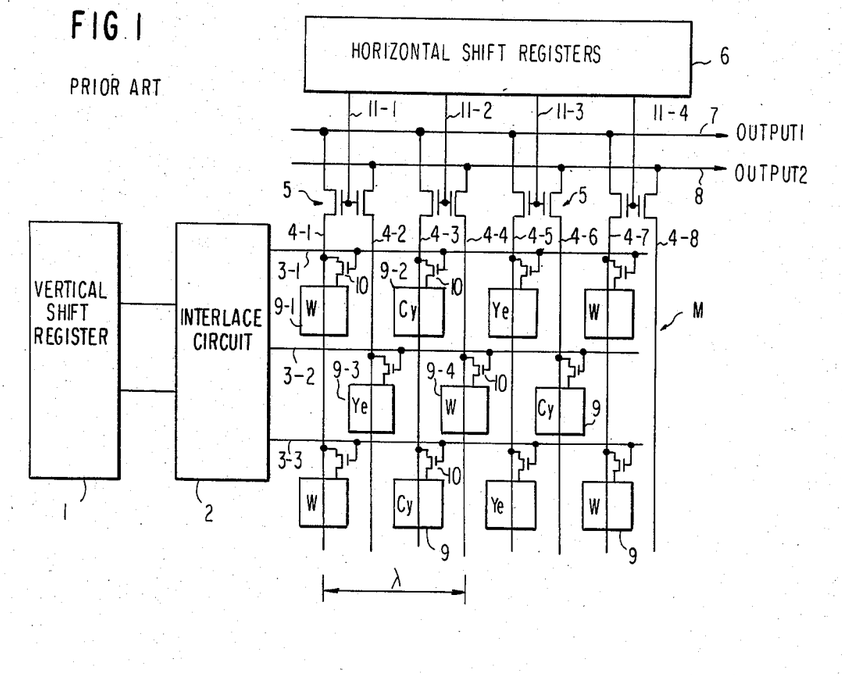
FIG. 1 is a diagram of a prior art color solid-state image sensor device of the same general type to which the invention pertains.

A prior art solid-state color image sensor of the same general type to which the invention pertains is shown in FIG. 1 herein and described in detail in a paper by N. Ozawa et al., "Picture Quality Improvement of MOS-Type Single-Chip Color Video Camera", National Conference of the Institute of Television Engineers of Japan, pp. 83 and 84, 1982. This color image sensor device is composed of an array (matrix) M of pixels (picture elements) 9 arranged in rows and columns. Each pixel 9 includes a photosensitive element, such as a photodiode or the like, and an FET switch 10. Some of the pixels 9 are provided with filters so that their photosensitive elements are sensitive only to light of a certain color. In the example shown in FIG. 1, each row of pixels 9 has sensors sensitive to white, cyan and yellow light, indicated in the figure by W, Cy and Ye, respectively, with this pattern being repeated along the row. The pixels in alternate rows are arranged staggered with respect to the pixels of the adjacent rows. For example, the yellow-sensitive pixel 9-3 is arranged under and between pixels 9-1 and 9-2, which are sensitive to white and cyan, respectively. Of course, many more pixels would ordinarily be present in a sensor array than are shown in FIG. 1; a reduced number is illustrated only for clarity of illustration.

The array M is further composed of vertically-scanned lines 3-1, 3-2, 3-3, etc. and horizontally-scanned lines 4-1, 4-2, 4-3, etc. (Although the "vertically-scanned" lines 3-1, etc. extend in the horizontal direction in the figure and the "horizontally-scanned" lines 4-1, etc. extend in the vertical direction in the figure, they are termed "vertically-scanned" and "horizontally-scanned" lines, respectively, because the vertically-scanned lines 3-1, etc. are electronically scanned in the vertical direction in the figure and the lines 4-1, etc. are scanned in the horizontal direction in the figure during read out of the array.) The output electrodes (drains) of the FET switches 10 in each column, that is, outputs from pixels 9 which are sensitive to the same color, are coupled to the same horizontally-scanned line. The gates of all FET switches 10 in each row are connected to a corresponding one of the vertically-scanned lines 3-1, etc. A vertical shift register 1, acting through an interlace circuit 2, generates sequential activating pulses on the vertically-scanned lines 3-1, etc. in a manner to be described below. Each of the lines 3-1, etc. is connected through a respective output FET switch 5 to one of two output lines 7 (OUTPUT 1) and 8 (OUTPUT 2). The FET switches 5 are provided in pairs with gates connected together and to a respective output 11-1, etc. from a horizontal shift register 6.

Figure 2:
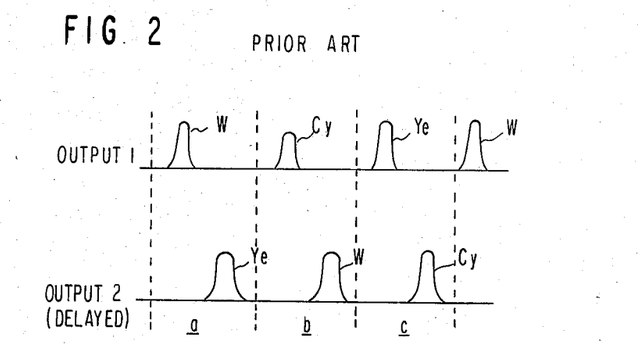
FIG. 2 is a waveform diagram showing the form of output signals produced by the sensor device of FIG. 1.
Figure 3:
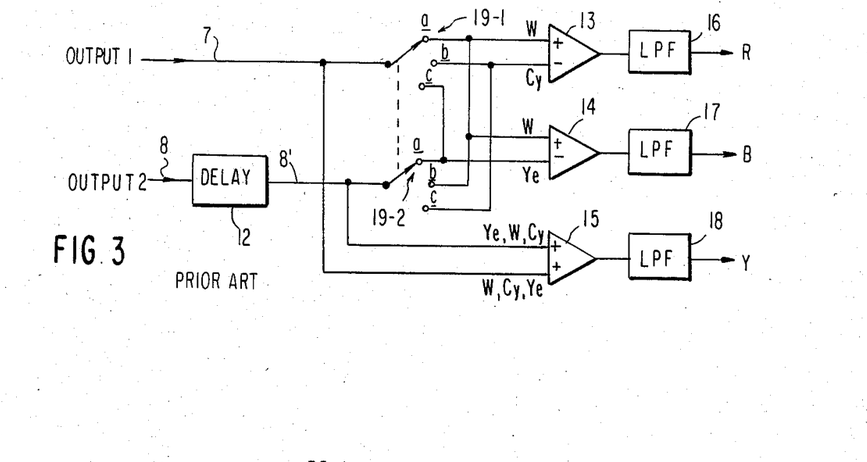
FIG. 3 is a schematic diagram of a signal processing circuit which is used with the sensor device of FIG. 1.

With reference now to FIG. 3, the output line 7 is connected directly to the armature of a first switch 19-1. The output line 8 is connected to a delay line 12, and thence on a line 8' to the armature contact of a second switch 19-2. Sum/difference circuits 13, 14 and 15, which may be implemented with operational amplifiers, receive inputs from the lines 7 and 8' via the switches 19-1 and 19-2. The switches 19-1 and 19-2 are operated by a drive circuit (not shown) so that, although each of lines 7 and 8' carry output signals composed of series of signal pulses provided by pixels sensitive to all four colors, the sum/difference circuit 13 receives only the white and cyan signal pulses and the sum/difference circuit 14 the white and yellow signals pulses. More specifically, the switches 19-1 and 19-2 are rotated together among labelled switch positions a, b and c in FIG. 3 for respective time periods a, b and c indicated in FIG. 2. In switch position a, the sum/difference circuit 13, for example, receives a white pulse from line 7 and no pulse from line 8', in switch position b, it receives a cyan pulse from line 7 and a white pulse from line 8', and in switch position c, it receives no pulse from line 7 and a cyan pulse from line 8'. This sequence then repeats. It may be verified in a similar fashion that the sum/difference circuit 14 receives white and yellow pulses. The sum/difference circuit 15 receives all pixel outputs.

The outputs of the sum/difference circuits 13, 14 and 15 are filtered by corresponding low-pass filters 16, 17 and 18 to effectively integrate the outputs of the sum/difference circuits 13, 14 and 15 (merging positive and negative pulses), and thus producing final output signals R ($=W-Cy$), B ($=W-Ye$) and Y ($=W+Cy+Ye$), which represent the red, blue and luminance components, respectively.

In operation, the vertically-scanned lines 3-1, etc. are activated by the vertical shift register 1 and the interlace circuit 2 in pairs so as to effect interlaced scanning of the array. For instance, in a first field, the lines 3-1 and 3-2 are simultaneously activated, and in a second field, the lines 3-2 and 3-3 are simultaneously activated. When, for example, the lines 3-1 and 3-2 are simultaneously activated, all FET switches 10 in the top two rows of pixels are simultaneously turned on. This causes a transfer of signal charges which have accumulated in the respective pixels, in amounts dependent upon the amount of light of the appropriate wavelength which has been received since the last read-out period, to the respective horizontal lines 4-1, etc.

After this charge transfer has occurred, the outputs 11-1, etc. of the horizontal shift register 6 are activated in sequence. At the time that the output line 11-1, for instance, is activated, the signal charges on the lines 4-1 and 4-2 are simultaneously transferred to the output lines 7 and 8. Subsequently, when the line 11-2 is activated, the signal charges on the lines 4-3 and 4-4 are transferred to the output lines 7 and 8 simultaneously. Such scanning is effected for each row of the array. While each row is being scanned, the positions of the switches 19-1 and 19-2 are sequentially changed, in synchronism with the scanning, to route the output signals from the array on lines 7 and 8' to the appropriate inputs of the sum/difference circuits 13 and 14 so that the circuit 13 receives only the white and cyan signal pulses and the circuit 14 the white and yellow signal pulses.

Although the signals present on the output lines 7 and 8 could be fed directly to the switches 19-1 and 19-2 and thence to the appropriate inputs of the sum/difference circuits 13, 14 and 15 for combining to produce the desired color information signals R, B and Y, that is, without a delay, to do so would produce an output image which would contain information in incorrect spatial positions, hence providing a reproduced image of low resolution. More specifically, the white-sensitive pixel 9-1 and yellow-sensitive pixel 9-3, for instance, although they are read out simultaneously with one another, are not located in the same column but are offset in position. Hence, to make the output signal pulses from the array M emerge in a time sequential order which corresponds to the actual positions of the pixels in the array, it is necessary to effect a delay of the output signal on line 8 from the output signal on line 7. It is for this reason that the delay line 12 is provided in the second output line 8.

The delay time of the delay line 12 should be equal to one-third a pixel-pitch scan time, that is, equal to the time it would take to scan through a distance of $\lambda/3$ in the array M of FIG. 1, where $\lambda$, the pixel pitch, is equal to the distance between centers, taken in the row direction, of two most closely adjacent pixels in adjacent rows sensitive to the same color of light. The resultant signals on lines 7 and 8' are shown in FIG. 2. It can readily be seen that the time positions of the various pulses which make up these signals correspond to the actual positions of the respective pixels in the array.

The arrangement of FIGS. 1-3 is disadvantageous in the following points. Because both the output lines 7 and 8 sequentially receive output signals representative of all three colors, and because the red color signal and blue color signal must be generated using only pairs of these, namely, white minus cyan and white minus yellow, respectively, it is necessary to provide the switches 19-1 and 19-2 between the output lines 7 and 8' and the respective inputs of the sum/difference circuits 13 and 14. These switches, and the circuits which must necessarily be provided for driving them, add circuit complexity. Also, the presence of such switches is disadvantageous in that transients are produced when the switch positions are changed, which tends to distort the color signal outputs.

Accordingly, it is an object of the present invention to provide a solid-state color image sensor device which has the advantages of improved resolution brought about by appropriately delaying certain of the output signals from the sensor array, but which does not suffer from the above-mentioned drawbacks.

SUMMARY OF THE INVENTION

This, as well as other objects of the invention, are met by a solid-state color image sensor in which pixels sensitive to each of at least three colors of light are read out onto output lines associated only with the respective color. The signal on one of the output lines is undelayed, while the signals on the other two lines are delayed by times equal to the times that it would take to scan from a pixel, the output of which is undelayed, to the respective positions of the pixels, the outputs of which are delayed, along a row, if the row were being scanned at a uniform, constant rate. More specifically, if pixels are provided which are sensitive to three different colors of light and if the pixels are arranged in triads, namely, groups of three in a triangular pattern with each group containing one pixel of each color, delay times equal to the times that it would take to scan through one-third and two-thirds of a pixel pitch are employed. The pixel pitch is equal to the distance between centers of two most closely adjacent pixels sensitive to the same color in adjacent rows taken in the row direction, that is, projected onto a line parallel to the row direction. As used herein, "color" is intended, for convenience, to include white as well as the primary colors red, blue and green and their complements.

More particularly, the invention can be practiced by a solid-state color image sensor including an array of pixels arranged in rows and columns with the pixels within the array being grouped in groups of at least three pixels, each pixel of which is sensitive to light of a different color, a plurality of signal collecting output lines one of which is provided for each of the colors of the pixels, means for reading color image signals from one group at a time simultaneously onto the respective ones of the output lines provided for the same color, means for delaying signals read out onto at least two of the output lines by times corresponding to scanning times to the corresponding pixels from the pixel of the group associated with the undelayed output line, and means for combining the delayed and undelayed ones of the output signals on the output lines in predetermined combinations so as to produce, for instance, signals corresponding to at least two of the primary colors and a luminance signal. Preferably, the pixels have a hexagonally shaped light-sensitive area to maximize the light sensitivity of the pixels and to reduce moiré fringing effects. The delaying means can be implemented in either one of two ways: by providing delay elements directly in the output lines or by reading the output signals directly (undelayed) from the output lines into a memory and later reading the same signals out of the memory with a timing which emulates the requisite delays.

DESCRIPTION OF THE PREFERRED EMBODIMENTS

Referring now to the diagram of FIG. 4, a first preferred embodiment of a solid-state color image sensor device of the invention will be described.

Similar to the sensor device of FIG. 1, the image sensor device of the invention includes an array M' of pixels arranged in rows and columns, with pixels in alternate rows staggered, that is, having centers which fall along lines which pass halfway between the centers of the pixels in the two contiguous rows. The color filter pattern utilized with the invention may be the same as that in the prior art arrangement discussed above. However, it is preferred that the pixels 26 have a light-sensitive portion which is hexagonally shaped.

Such an arrangement is described in detail in co-pending United States patent application Ser. No. 307,146, now U.S. Pat. No. 4,441,123, filed Sept. 30, 1981. The reason for this is that the light sensitivity of each pixel 26 is increased over that possible with the prior art arrangement of FIG. 1 and moiré fringing effects are reduced. Also, a zig-zag vertical line pattern, as described in allowed co-pending application Ser. No. 501,332, filed June 6, 1983, may be employed to maximize the light sensitive areas. A vertical shift register 20 and an interlace circuit 22 may be provided similar to the arrangement of FIG. 1. If desired, an arrangement such as that described in co-pending United States application Ser. No. 478,975, now U.S. Pat. No. 4,542,409, filed Mar. 25, 1983, can be employed to eliminate the interlace circuit 22 and simplify the drive circuitry needed to scan the array in the vertical direction.

In accordance with an important aspect of the invention, in the case that pixels sensitive to three different light colors are employed, three separate output lines 35-1, 35-2 and 35-3 are provided. Each of the three output lines 35-1, 35-2 and 35-3 is associated with a single color only: the line 35-1 with yellow, the line 35-2 with cyan, and the line 35-3 with white. The pixels are grouped as shown in FIG. 4 so that triads (groups of three in a triangular arrangement) of the pixels 26 are formed. Each pixel in a triad is sensitive to a different color. In the embodiment of FIG. 4, one such triad is composed of a yellow-sensitive pixel 26-1, a white-sensitive pixel 26-2 and a cyan-sensitive pixel 26-3. A horizontally-scanned line 30-1, etc. is provided for each column of pixels associated with one color. Here, the horizontally-scanned line 30-1 is associated with yellow, the line 30-2 with cyan, and the line 30-3 with white.

An FET switch 33-1, etc. is provided for each of the horizontally-scanned lines 30-1, etc. These FET switches are provided in groups of three, one for each color, each connecting a respective horizontally-scanned line with the one of the output lines 35-1, 35-2 and 35-3 associated with the same color as the respective horizontally-scanned line. Specifically, the FET switch 33-1 selectively couples the horizontally-scanned line 30-1 associated with yellow to the output line 35-1 associated with yellow, the FET switch 33-2 selectively couples the horizontally-scanned line 30-2 associated with cyan to the output line 35-2 associated with cyan, and the FET switch 33-3 selectively couples the horizontally-scanned line 30-3 associated with white to the output line 35-3 associated with white. The gates of the three FET switches in each group are coupled together and connected to a corresponding output line 37-1, 37-2, etc., of a horizontal shift register 40.

Delay elements 42 and 43 are connected in series with the output lines 35-2 and 35-3, respectively. The delay element 42 imposes a delay time of $\tau/3$ and the delay element 43 a delay of $2\tau/3$, where $\tau$ is equal to the time that it would take to scan, if the array were being scanned at a constant rate corresponding to a fixed read-out rate, through the distance of a pixel pitch $\lambda$.

The outputs present on the undelayed output line 35-1 and the outputs of the delay elements 42 and 43 on lines 36-2 and 36-3, respectively, are applied to inputs of sum/difference circuits 45, 46 and 47. The output 56-1 of the sum/difference circuit 45, which relates to the luminance signal Y, is produced by summing the signals present on each of the lines 35-1, 36-2 and 36-3; the output 56-2 of the sum/difference circuit 46, which corresponds to the red chrominance signal R, is produced by subtracting the cyan output signal present on the line 36-2 from the white output signal present on the line 36-3; and the output 56-3 of the sum/difference circuit 47, which relates to the blue chrominance signal B, is formed by subtracting the undelayed yellow output signal on the line 35-1 from the white output signal on the line 36-3. The outputs of each of the sum/difference circuits 45, 46 and 47 are passed through corresponding low-pass filters 51, 52 and 53 to produce the final luminance signal Y and red and blue chrominance signals R and B on the lines 57-1, 57-2 and 57-3 respectively. These signals are fed to appropriate inputs of a display or data recorder 55 for immediate or subsequent display in a well-known manner.

In operation, the vertical shift register 20 and the interlace circuit 22 activate the vertically-scanned lines 23-1 etc. in pairs so as to effect interlaced scanning. After the signal charges have been transferred from each pixel in the adjacent rows of pixels which are simultaneously activated, the horizontal shift register 40 is driven to activate the lines 37-1, etc. in sequence. Activation of the line 37-1 turns on the three FET switches 33-1, 33-2 and 33-3, thereby simultaneously reading onto the output lines 35-1, 35-2 and 35-3 the signal charges from the three pixels 26-1, 26-2 and 26-3 which form one triad. After being delayed by the delay elements 42 and 43, the outputs on lines 35-1, 36-2 and 36-3 appear as shown in FIGS. 5B through 5D for corresponding horizontal shift register periods indicated in FIG. 5A. The resulting outputs of the sum/difference circuits 45 to 47 are shown in FIGS. 5E through 5G, respectively, and the final outputs of the low-pass filters 51 to 53 in FIGS. 5H through 5J, respectively.

It may be readily appreciated by this point that the invention indeed achieves the above-mentioned object. Specifically, it provides the high spatial resolution made possible by properly time aligning the outputs from the various pixels while avoiding the necessity of high-speed switches and their accompanying drawbacks.

Figure 8:
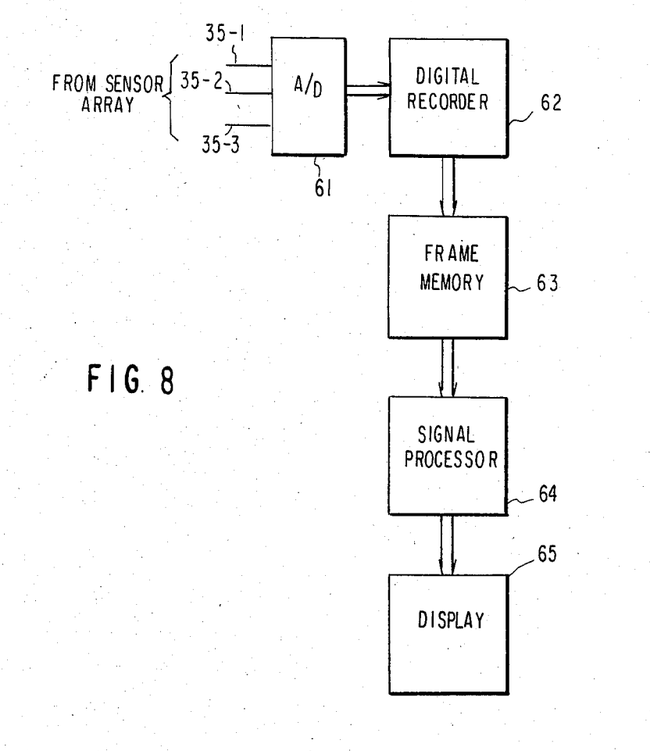
FIG. 8 is a block diagram showing a yet further embodiment of a solid-state color image sensor device signal processing circuit of the invention.

A further embodiment of the invention is illustrated in the block diagram of FIG. 8. In this drawing, the arrangement of the array M', the horizontal and vertical shift registers, the interlace circuit and the FET switches are the same as in FIG. 4, and hence, for simplicity, they have been omitted.

In this second embodiment, the output lines 35-1, 35-2 and 35-3 are fed to the input of an analog-to-digital converter 61 where their respective output signals are digitized. If a sufficiently high speed analog-to-digital converter is available, a single such device may be employed since the signal pulses corresponding to the three different colors on the respective three output lines emerge at different times. The digitized signals are recorded by a digital recorder 62, and then stored in a frame memory 63. There is one storage location assigned in the frame memory 63 for each pixel in the matrix. The data stored in the frame memory 63 is read out by a signal processor 64 and then applied to a display or recorder 65. The signal processor 64 reads out the various pixel output signals in digitized form from the frame memory 63 at times which emulate the delay times $\tau/3$ and $2\tau/3$ effected by the delay elements 42 and 43 in the device of FIG. 4.

Figure 4:
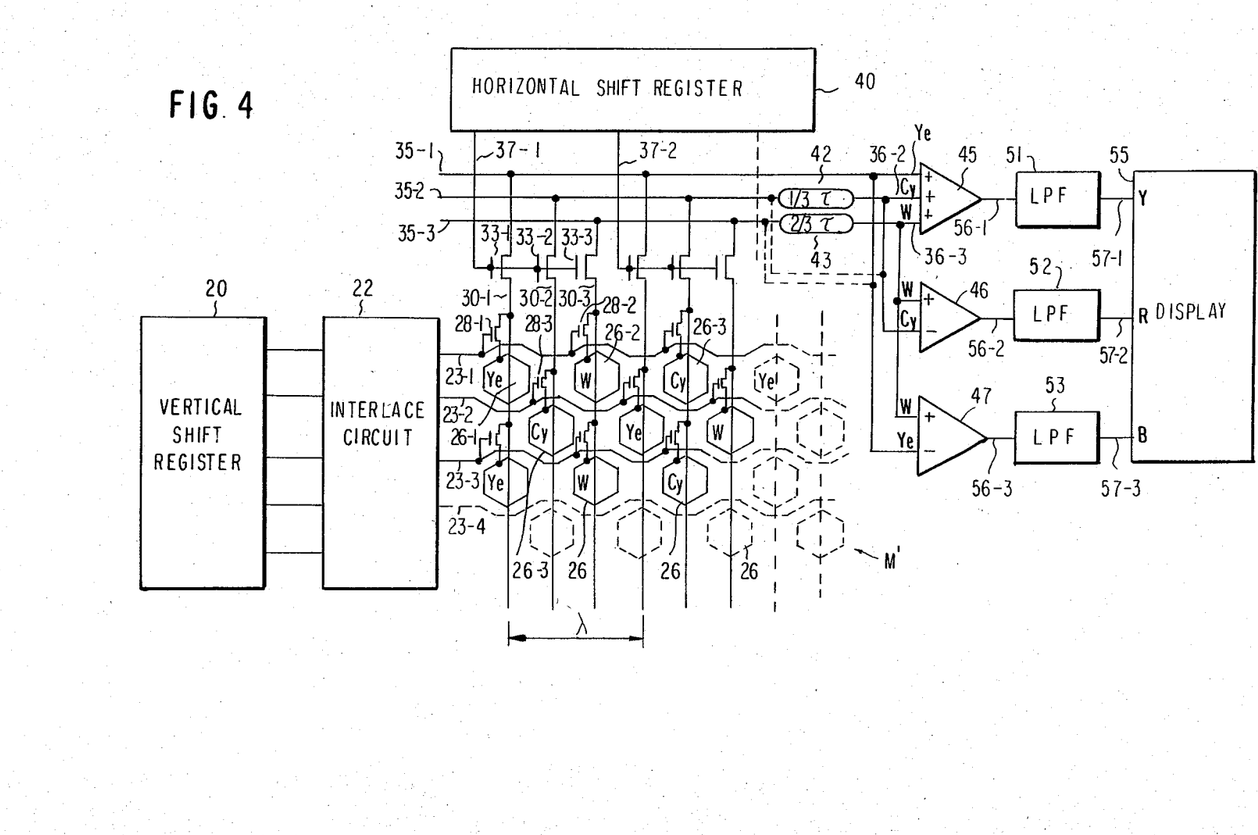
FIG. 4 is a diagram of a color solid-state image sensor device constructed in accordance with the invention.
Figure 5A:
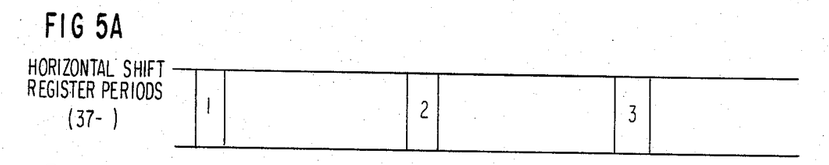
FIGS. 5A through 5J, taken together, are a waveform diagram used to explain the operation of the device of FIG. 4.
Figure 5B:
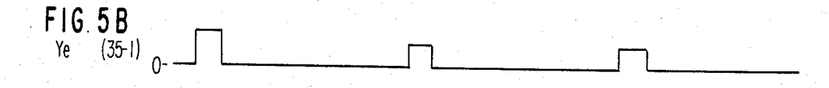
Figure 5C:
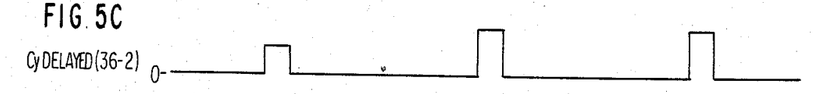
Figure 5D:
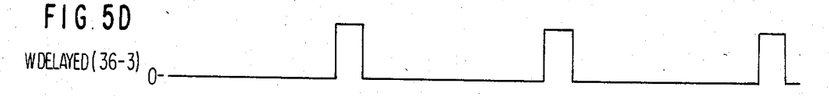
Figure 5E:
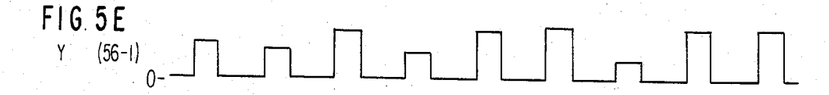
Figures 5F, 5G, 5H:
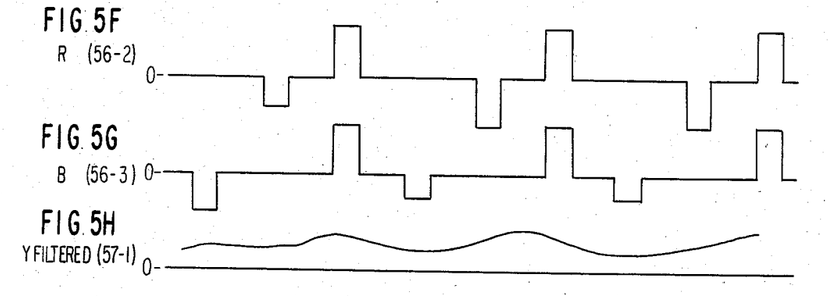
Figure 5I:
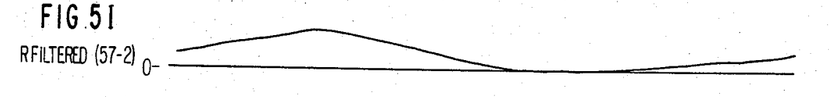
Figure 5J:
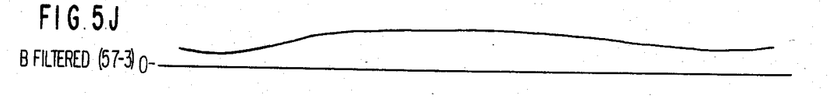
Figure 6:
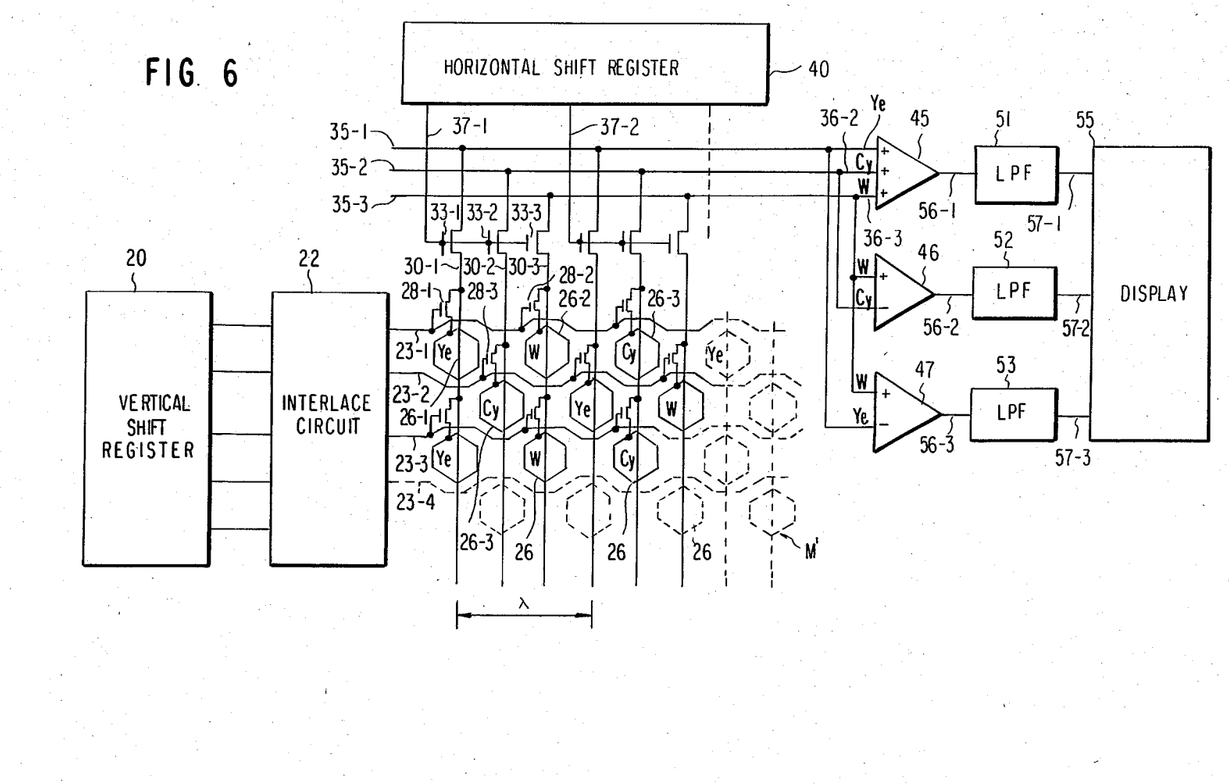
FIG. 6 is a diagram of an alternate embodiment of a color solid-state image sensor device of the invention.
Figure 7A:
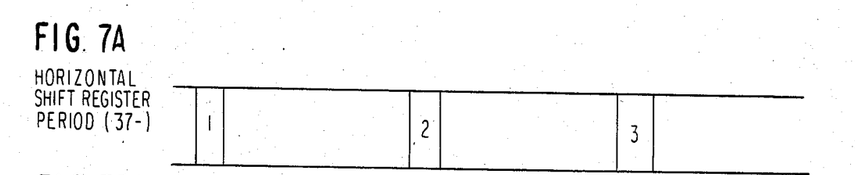
FIGS. 7A through 7J, taken together, are a waveform diagram used to explain the operation of the device of FIG. 6.
Figure 7B:
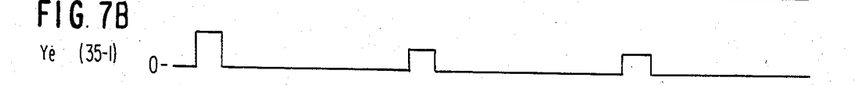
Figure 7C:
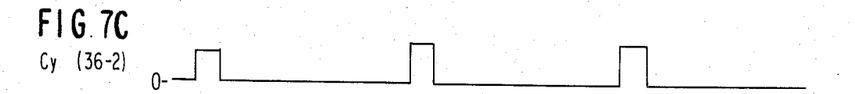
Figure 7D:
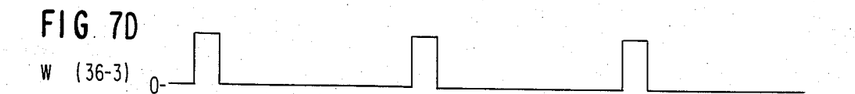
Figure 7E:
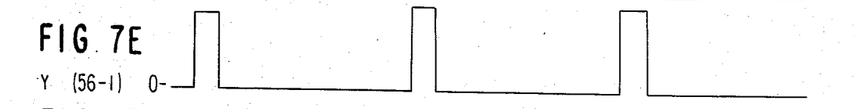
Figure 7F:
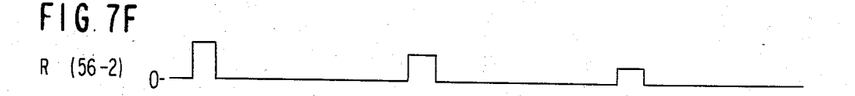
Figure 7G:
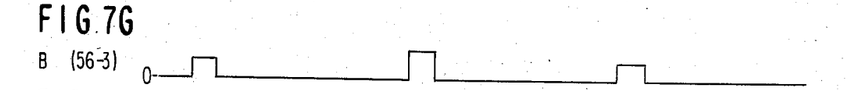
Figure 7H:
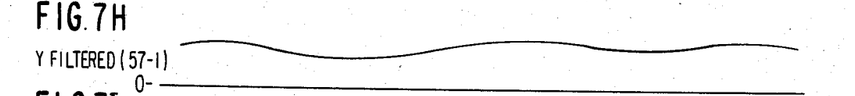
Figure 7I:
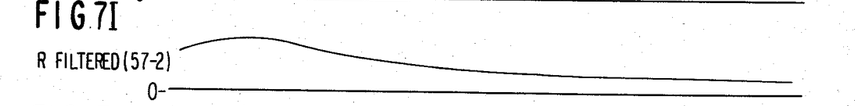
Figure 7J:
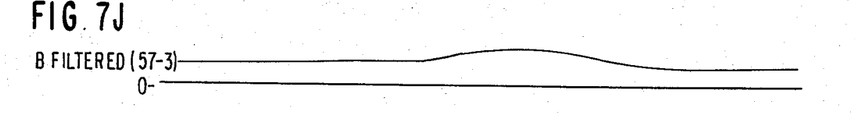

A modification of the embodiment of FIG. 4 is shown in FIG. 6. The FIG. 6 embodiment differs from that of FIG. 4 only in that the inputs to the sum/difference circuits 46 and 47 are not delayed by the delay elements 42 and 43. FIGS. 7A through 7J are a waveform diagram similar in content to FIGS. 5A through 5J, respectively, showing signals in the circuit of the embodiment of FIG. 4. As can be appreciated by comparing FIGS. 7F, 7G, 7I and 7J with FIGS. 5F, 5G, 5I and 5J, respectively, the effect of this modification is to cause the positive and negative pulses applied to the inputs of the sum/difference circuits 46 and 47 to occur simultaneously and earlier in time, hence tending to shift the filtered outputs on the lines 57-2 and 57-3 to the left in FIGS. 7I and 7J, although the shapes of the corresponding waveforms are changed slightly. In this embodiment, the fall-off frequencies of the filters 51, 52 and 53 may be lower than in the previously described embodiment. Otherwise the operations of the two embodiments are the same.

This completes the description of the preferred embodiments of the invention. Although preferred embodiments have been described, it is believed that numerous alterations and modifications thereof would be apparent to one of ordinary skill in the art without departing from the spirit and scope of the invention.

We claim:

1. A solid-state color image sensor comprising:
a plurality of pixels arranged in an array of rows and columns, said pixels being arranged in said array in groups each containing at least three pixels, each pixel in each group being sensitive to light of a different color;
a plurality of signal collecting output lines, one of said output lines being provided for each of said colors;
means for reading out color image signals from said groups in a predetermined sequence of groups with signals from all pixels within each group being read out simultaneously and being applied to respective ones of said output lines provided for the same color as that to which the respective pixels are sensitive;
means for delaying signals read out onto at least two of said output lines by time periods corresponding to scanning times in a direction of said rows from a one of said pixels in each of said groups, the output signal from which is not delayed, to respective ones of said pixels, the outputs from which are read out onto said at least two of said output lines; and
means for combining delayed and undelayed ones of said output signals in predetermined combinations to provide a luminance signal and at least two chrominance signals.

2. The solid-state color image sensor of claim 1, wherein each said group comprises three pixels, one pixel sensitive to white light, one pixel sensitive to cyan light and one pixel sensitive to yellow light.

3. The solid-state color image sensor of claim 2, wherein said delaying means comprises first and second delay elements, said first delay element having a delay time corresponding to one-third of a group-pitch scan time and said second delay element having a delay time corresponding to two-thirds of said group-pitch scan time.

4. The solid-state color image sensor of claim 1, wherein each of said pixels comprises a hexagonally shaped light-sensitive portion.

5. The solid-state color image sensor of claim 4, wherein each of said groups comprises a triad of said pixels.

6. The solid-state color image sensor of claim 1, wherein said delaying means comprises a frame memory for storing outputs of each of said pixels in said array and signal processing means for reading said outputs of said pixels stored in said frame memory from said frame memory.

7. The solid-state color image sensor of claim 1, wherein said combining means comprises a plurality of sum/difference circuits for combining said delay and undelayed ones of said output signals.

8. A solid-state color image sensor comprising:
a plurality of pixels arranged in an array of rows and columns, each of said pixels having a hexagonally shaped light-sensitive area, pixels in each of said rows being arranged in a repeating pattern of pixels sensitive to yellow, white and cyan light, pixels in alternate rows having centers falling along lines passing through points halfway between centers of the most closely adjacent pixels in contiguous rows, pixels in each column being sensitive to the same color of light, and pixels in contiguous rows forming triads of pixels, one triad comprising pixels sensitive to each of white, cyan and yellow light;
a plurality of horizontally-scanned vertical lines, one of said horizontally-scanned lines being provided for each column of pixels in said array sensitive to the same color of light;
a plurality of first switching devices for selectively coupling outputs of said pixels to respective ones of said horizontally-scanned lines;
means for actuating said switching devices for effecting interlaced scanning of said array such that outputs from two contiguous rows of said pixels are simultaneously read out onto respective ones of said horizontally-scanned lines;
first, second and third output lines corresponding to colors of yellow, cyan and white, respectively;
a plurality of groups of second switching devices, each of said groups of said second switching devices comprising three said second switching devices, said second switching devices being provided in a number equal to the sum of the number of pixels in any two adjacent rows of said array, each of said secod switching devices having an input terminal coupled to a respective one of said horizontally-scanned lines and an output terminal coupled to the one of said output lines corresponding to the same color of light to which are sensitive pixels in a column to which the respective horizontally-scanned line is coupled;
means for actuating said groups of second switching devices in sequence;
first and second delay elements coupled in series with said second and third output lines, respectively, said first delay element having a delay time equal to one-third of a triad-pitch scan time and said second delay element having a delay time equal to two-thirds a triad-pitch scan time;
first through third sum/difference circuits; said first sum/difference circuit having noninverting inputs coupled to each of said first output line, an output of said first delay element, and an output of said second delay element; said second sum/difference circuit having a noninverting input coupled to said output of said second delay element and an inverting input coupled to said output of said first delay element; and said third sum/difference circuit having a noninverting input coupled to said output of said second delay element and a noninverting input coupled to said first output line; and first through third low-pass filters connected in series with outputs of said first through third sum/difference circuits, respectively.

9. A method for extracting output signals from a solid-state color image sensor composed of a plurality of pixels arranged in an array of rows and columns with the pixels being arranged in groups containing at least three pixels, each pixel in said groups being sensitive to a different color of light, comprising the steps of:

reading out onto a set of output lines, equal in number to the number of pixels in each said group, output signals from each of said groups in sequence, signals from pixels within each said group being read out simultaneously, and signals from pixels sensitive to the same color of light being read out onto corresponding same ones of said output lines;

delaying all but one of the output signals on said output lines by predetermined time delays; and combining delayed and undelayed ones of said output signals in predetermined combinations.

10. The method of claim 9, wherein said delay times correspond to scanning times in a row direction from one of said pixels in each of said groups, the output signal of which is not delayed, to the other said pixels in each of said groups, the output signals of which are delayed.

* * * * *